US012760187B2

(12) United States Patent
Hughes et al.

(10) Patent No.: US 12,760,187 B2
(45) Date of Patent: Oct. 13, 2026

(54) COATINGS FOR BUILDING PANELS

(71) Applicant: ARMSTRONG WORLD INDUSTRIES, INC., Lancaster, PA (US)

(72) Inventors: John E. Hughes, Lincoln University, PA (US); Linzhu Zhang, Ephrata, PA (US)

(73) Assignee: AWI Licensing LLC, Wilmington, DE (US)

( * ) Notice: Subject to any disclaimer, the term of this patent is extended or adjusted under 35 U.S.C. 154(b) by 306 days.

(21) Appl. No.: 18/383,640

(22) Filed: Oct. 25, 2023

(65) Prior Publication Data

US 2024/0141177 A1 May 2, 2024

Related U.S. Application Data

(60) Provisional application No. 63/420,209, filed on Oct. 28, 2022.

(51) Int. Cl.

| | |
|---|---|
| ***C09D 5/18*** | (2006.01) |
| ***C09D 1/00*** | (2006.01) |
| ***C09D 1/04*** | (2006.01) |
| ***C09D 7/63*** | (2018.01) |
| ***E04B 9/00*** | (2006.01) |

(52) U.S. Cl.

CPC ................ *C09D 5/18* (2013.01); *C09D 1/00* (2013.01); *C09D 1/04* (2013.01); *C09D 7/63* (2018.01); *E04B 9/001* (2013.01)

(58) Field of Classification Search

CPC ... C09D 5/18; C09D 1/00; C09D 1/04; C09D 7/63; E04B 9/001

See application file for complete search history.

(56) References Cited

U.S. PATENT DOCUMENTS

| | | | |
|---|---|---|---|
| 2,177,393 | A | 10/1939 | Parkinson |
| 2,582,144 | A | 1/1952 | Miles |
| 3,969,291 | A | 7/1976 | Fukuba et al. |
| 4,178,273 | A | 12/1979 | Brown |
| 4,849,298 | A | 7/1989 | Raevsky |
| 6,122,867 | A | 9/2000 | Leconte |
| 6,698,543 | B2 | 3/2004 | Golter |
| 7,063,184 | B1 | 6/2006 | Johnson |
| 7,654,364 | B2 | 2/2010 | Yamaguchi |

(Continued)

OTHER PUBLICATIONS

English translation for Guilloud et al (FR 2582847 A1) (Year: 1986).*

Lubrizol, Chembetaine Surfactant MSDS (Year: 2013).*

*Primary Examiner* — Nathan L Van Sell

(74) *Attorney, Agent, or Firm* — Patrick Sheldrake

(57) ABSTRACT

Described herein is a building panel comprising a first major exposed surface opposite a second major exposed surface, the building panel comprising: a body having a first major surface opposite a second major surface and a plurality of perforations extending from the first major surface toward the second major surface; a flame-retardant coating atop the first major surface of the body and extending into the plurality of perforations, the coating comprising a silicate compound and an amphoteric surfactant; and wherein the building panel has an airflow resistance of less than about 12,000 rayls as measured between the first major exposed surface and the second major exposed surface.

18 Claims, 5 Drawing Sheets

(56) References Cited

U.S. PATENT DOCUMENTS

| | | | | |
|---|---|---|---|---|
| 8,820,476 | B2 | 9/2014 | Nam et al. | |
| 10,570,617 | B2 | 2/2020 | Kolcun et al. | |
| 10,590,299 | B2 | 3/2020 | Tasaka et al. | |
| 10,697,177 | B2 | 6/2020 | Teng et al. | |
| 2013/0078422 | A1 | 3/2013 | Tinianov et al. | |
| 2014/0322548 | A1* | 10/2014 | Boldizsar | C08L 89/00 106/146.1 |
| 2018/0347186 | A1* | 12/2018 | Hughes | E04C 2/10 |
| 2019/0010697 | A1 | 1/2019 | Thomas et al. | |
| 2019/0136516 | A1* | 5/2019 | Hughes | B32B 15/20 |

* cited by examiner

COATINGS FOR BUILDING PANELS

CROSS-REFERENCE TO RELATED APPLICATIONS

This application claims the benefit of U.S. Provisional Patent Application No. 63/420,209 filed on Oct. 28, 2022. The disclosure of the above application is incorporated herein by reference.

BACKGROUND

Building products for interior room environments balance interests with respect to cosmetic value, material cost, acoustical performance, and fire safety. Previously, maximizing one or two of the aforementioned interests required sacrificing the remaining interests. Previous attempts at imparting fire repellency involved applied flame retardant compositions to the major surfaces of the cellulosic materials. However, such previous attempts could not result in a satisfactory acoustical panel. Thus, there is a need for building panels that can be formed from natural materials and exhibit flame-retardant nature without degradation the acoustical performance.

BRIEF SUMMARY

The present invention is directed to a building panel comprising a first major exposed surface opposite a second major exposed surface, the building panel comprising: a body having a first major surface opposite a second major surface and a plurality of body perforations extending from the first major surface toward the second major surface; a flame-retardant coating atop the first major surface of the body and extending into the plurality of body perforations, the coating comprising a silicate compound and an amphoteric surfactant; and wherein the building panel has an airflow resistance of less than about 12,000 rayls as measured between the first major exposed surface and the second major exposed surface.

Other embodiments of the present invention include a building panel comprising: a body having a first major surface opposite a second major surface and a plurality of body perforations extending from the first major surface toward the second major surface; a flame-retardant coating atop the first major surface of the body and extending into the plurality of body perforations, the coating comprising a silicate compound and an amphoteric surfactant; and wherein the building panel comprises: a first major exposed surface opposite a second major exposed surface; and a plurality of coated perforations extending from the first major exposed surface toward the second major exposed surface, wherein the coated perforations are formed by the flame-retardant coating located within of the plurality of the body perforations; and wherein the each of the plurality of coated perforations form an open channel that provide for fluid communication through the building panel between the first major exposed surface and the second major exposed surface.

According to other embodiments, the present invention includes a building panel comprising: a body having a first major surface opposite a second major surface and a plurality of body perforations extending from the first major surface toward the second major surface, each of the plurality of body perforations circumscribed by a body perforation wall; a flame-retardant coating atop the first major surface of the body and extending into the plurality of body perforations and coating at least a portion of the body perforation wall, the coating comprising a silicate compound and an amphoteric surfactant; and wherein each of the plurality of body perorations has a first diameter as measured by the distance between the body perforation wall; wherein the flame-retardant coating located within the body perforation and applied to the body perforation wall has a first thickness; and wherein the first thickness is equal to less than about 40% of the first diameter.

In other embodiments, the present invention includes a flame-retardant coating composition comprising: a liquid carrier; an inorganic composition comprising a silicate compound; an amphoteric surfactant; and wherein the coating composition has a minimum pH of 11.

The present invention further includes embodiments directed to a method of forming a flame-retardant building panel comprising a) applying a coating composition to a first major surface of a body, the body comprising a second major surface opposite the first major surface, and the body comprising a plurality of perforation extending from the first major surface toward the second major surface; b) drying the flame-retardant coating composition at an elevated temperature ranging from about 150° F. to about 220° F. to form a flame-retardant coating atop the body; wherein the coating composition comprises a liquid carrier, a silicate compound, and an amphoteric surfactant; and wherein the flame-retardant coating has a solids content of at least 99 wt. % based on the total weight of the flame-retardant coating.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
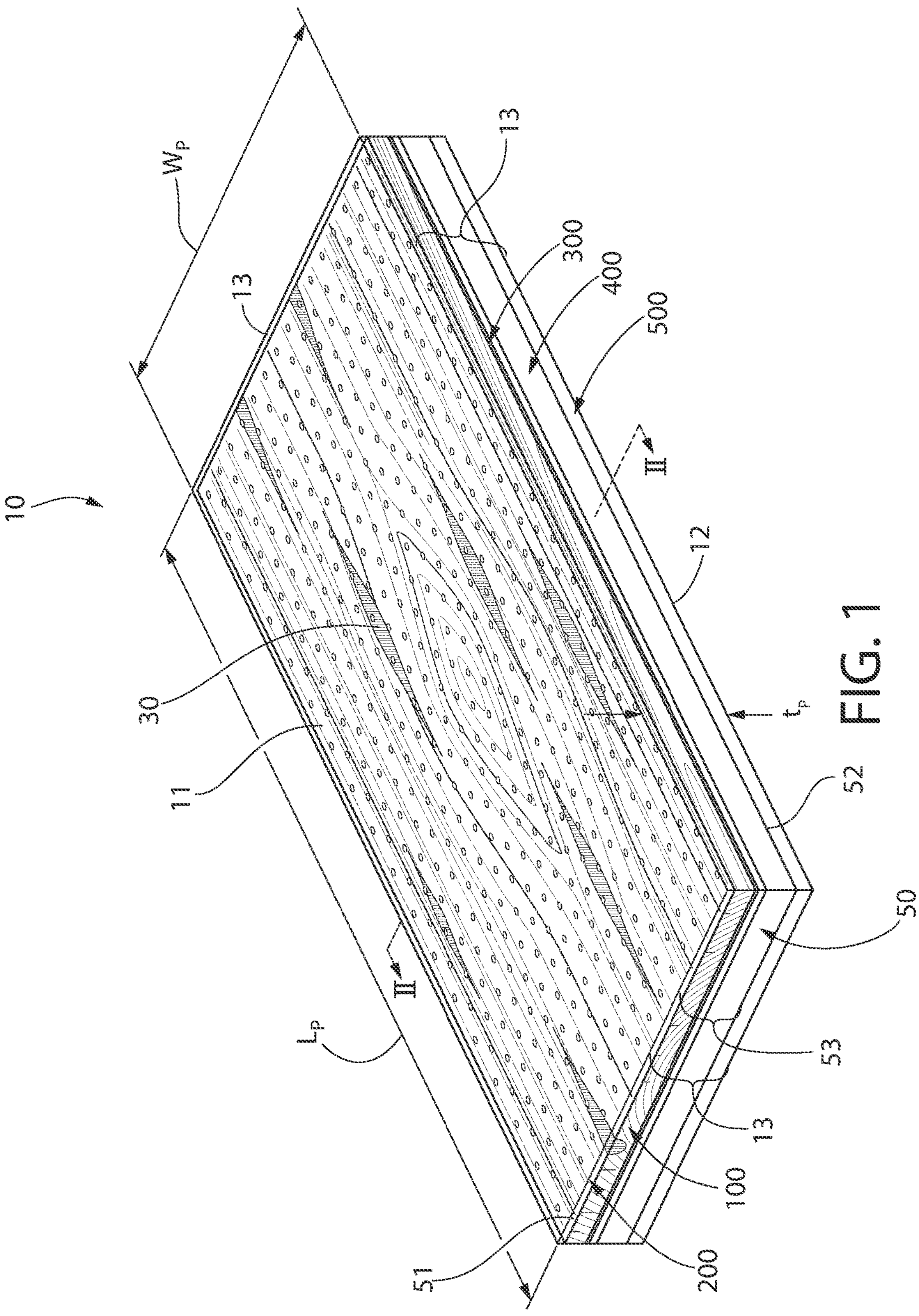
FIG. 1 is top perspective view of the building panel according to the present invention.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means+/−5% of the reference value. According to the present application, the term "substantially free" less than about 0.1 wt. % based on the total of the referenced value.

Figure 4:
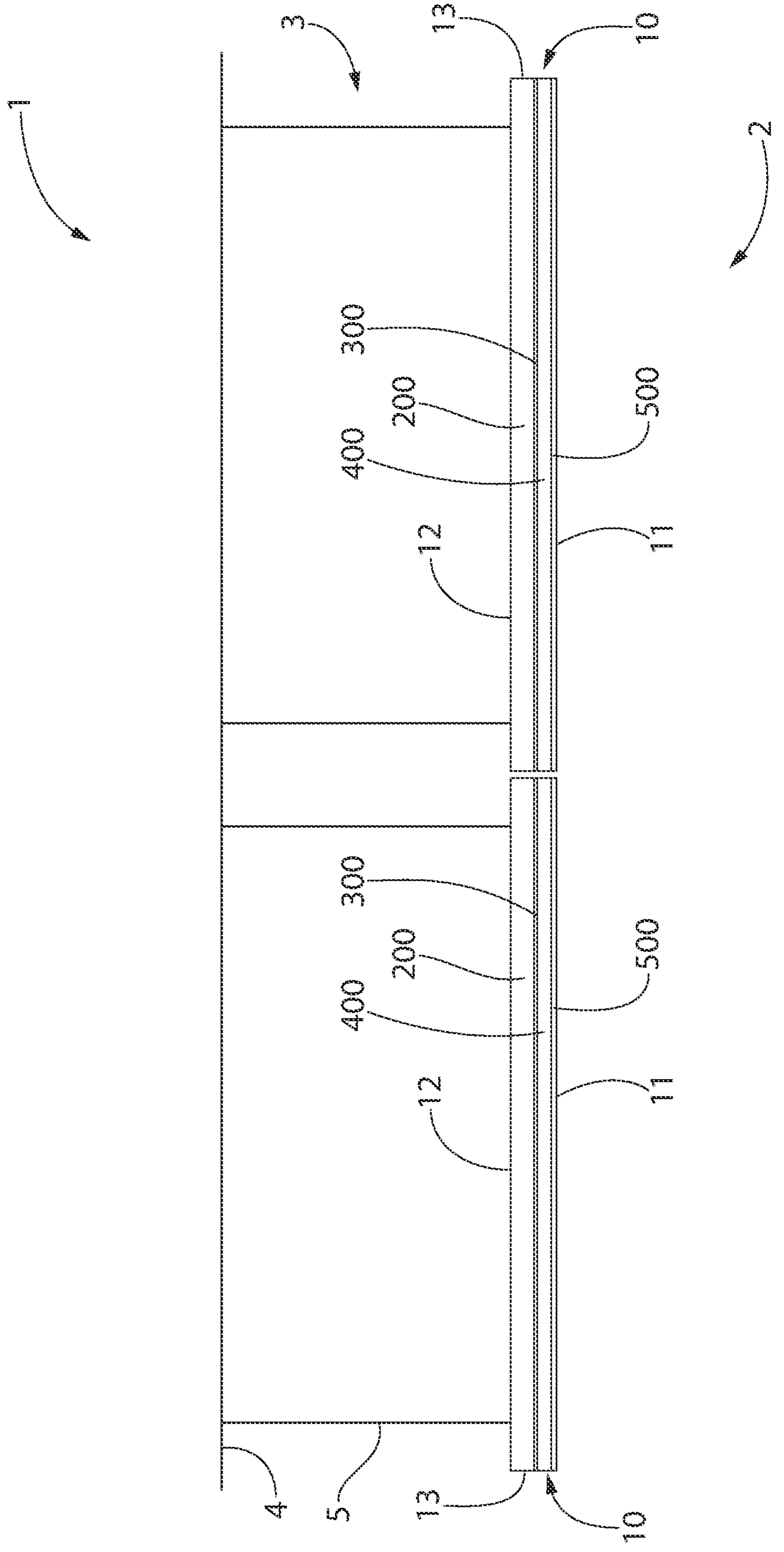
FIG. 4 is a ceiling system comprising the building panel of FIG. 1.

Referring to FIGS. 1 and 4, the present invention includes a building system 1 as well as a building panel 10 that may be used in the ceiling system 1. As shown in FIG. 4, the building system 1 is a ceiling system, however, the building system 1 of the present invention is not limited to ceiling systems. In alternative embodiments, the building system 1 may be a wall system (not shown). In other embodiments, the building system 1 may be a combination of a ceiling system and a wall system. As discussed herein, the building system 1 will be referred to as a ceiling system 1, but the following discussion may be applicable to wall systems.

The ceiling system 1 may comprise at least one or more of the building panels 10 installed in an interior space, whereby the interior space comprises a plenum space 3 and an active room environment 2. The plenum space 3 is defined by the space occupied between a structural barrier 4 between floors of a building and the lower major surface 12 of the building panel 10. The plenum space 3 provides space for mechanical lines within a building (e.g., HVAC, electrical lines, plumbing, telecommunications, etc.). The active space 2 is defined by the space occupied beneath the upper major surface 11 of the building panel 10 for one floor in the building. The active space 2 provides room for the building occupants during normal intended use of the building (e.g., in an office building, the active space would be occupied by offices containing computers, lamps, etc.).

Each of the building panels 10 may be supported in the interior space by one or more supports 5. Each of the building panels 10 are installed such that the upper major surface 11 of the building panel 10 faces the active room environment 2 and the lower major surface 12 of the building panel 10 faces the plenum space 3. The building panels 10 of the present invention have superior fire safety performance—particularly when a fire originates in the active room environment 2—without sacrificing the desired aesthetic appearance of the building panel 10, as discussed herein.

Referring to FIG. 1, the present invention is a building panel 10 having an upper major surface 11 (also referred to a first major exposed surface), a lower major surface 12 (also referred to a second major exposed surface) that is opposite the upper major surface 11, and major side surfaces 13 that extend from the upper major surface 11 to the lower major surface 12 to form a perimeter of the building panel 10.

The building panel 10 may have a panel thickness "$t_P$" as measured from the upper major surface 11 to the lower major surface 12. The panel thickness $t_P$ may range from about 25 mils to about 3,000 mils—including all values and sub-ranges there-between. In some embodiments, the panel thickness $t_P$ may range from about 25 mils to about 600 mils—including all values and sub-ranges there-between. In some embodiments, the panel thickness $t_P$ may range from about 700 mils to about 2,000 mils—including all values and sub-ranges there-between.

The building panel 10 may have a panel length "$L_P$" ranging from about 6 inches to about 100 inches—including all values and sub-ranges there-between. The building panel 10 may have a panel width "$W_P$" ranging from about 2 inches to about 60 inches—including all values and sub-ranges there-between. In some embodiments, the panel width $W_P$ may range from about 12 inches to about 60 inches—including all values and sub-ranges there-between.

Figure 2:
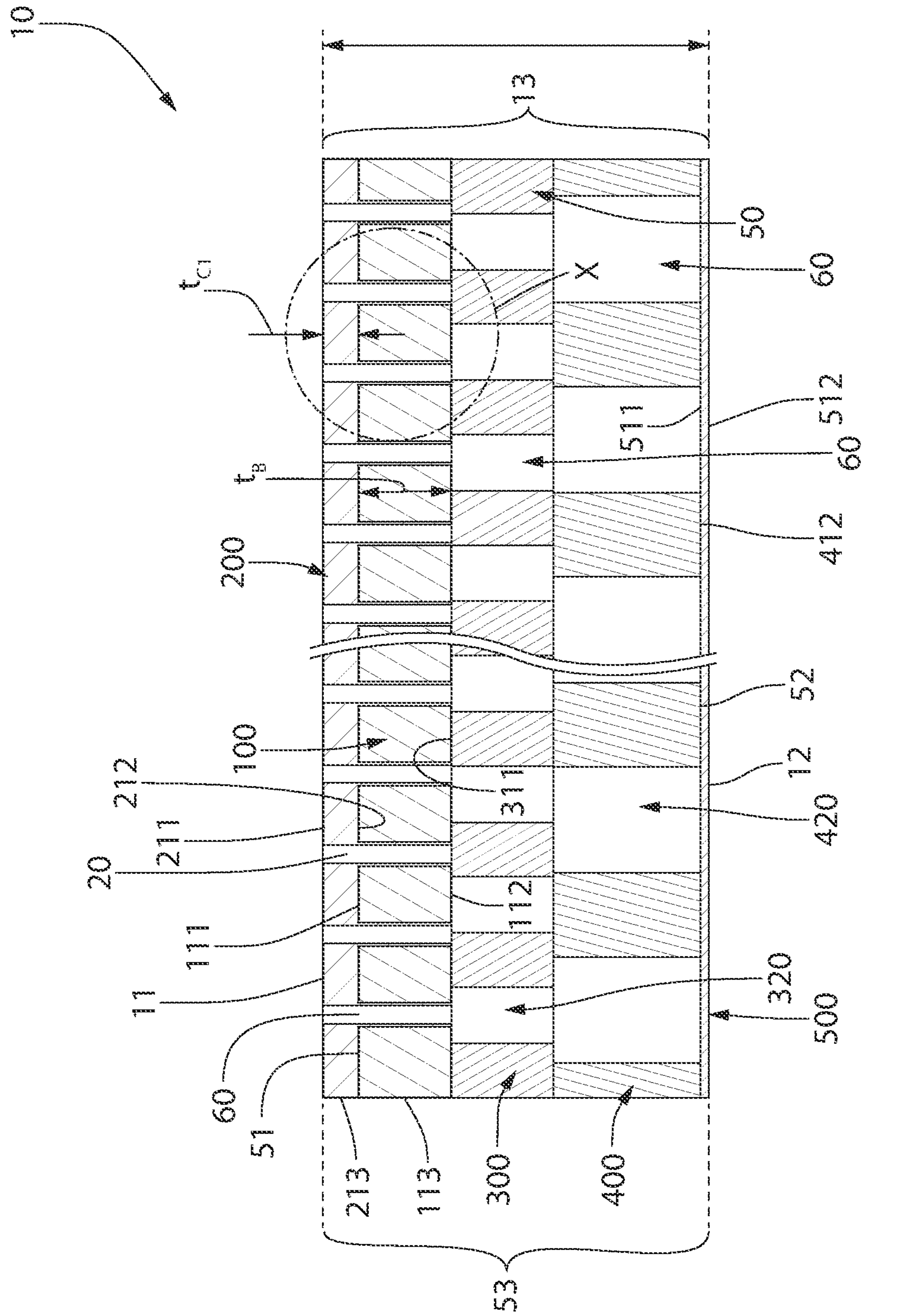
FIG. 2 is a cross-sectional view of the building panel according to the present invention, the cross-sectional view being along the II line set forth in FIG. 1.
Figure 3:
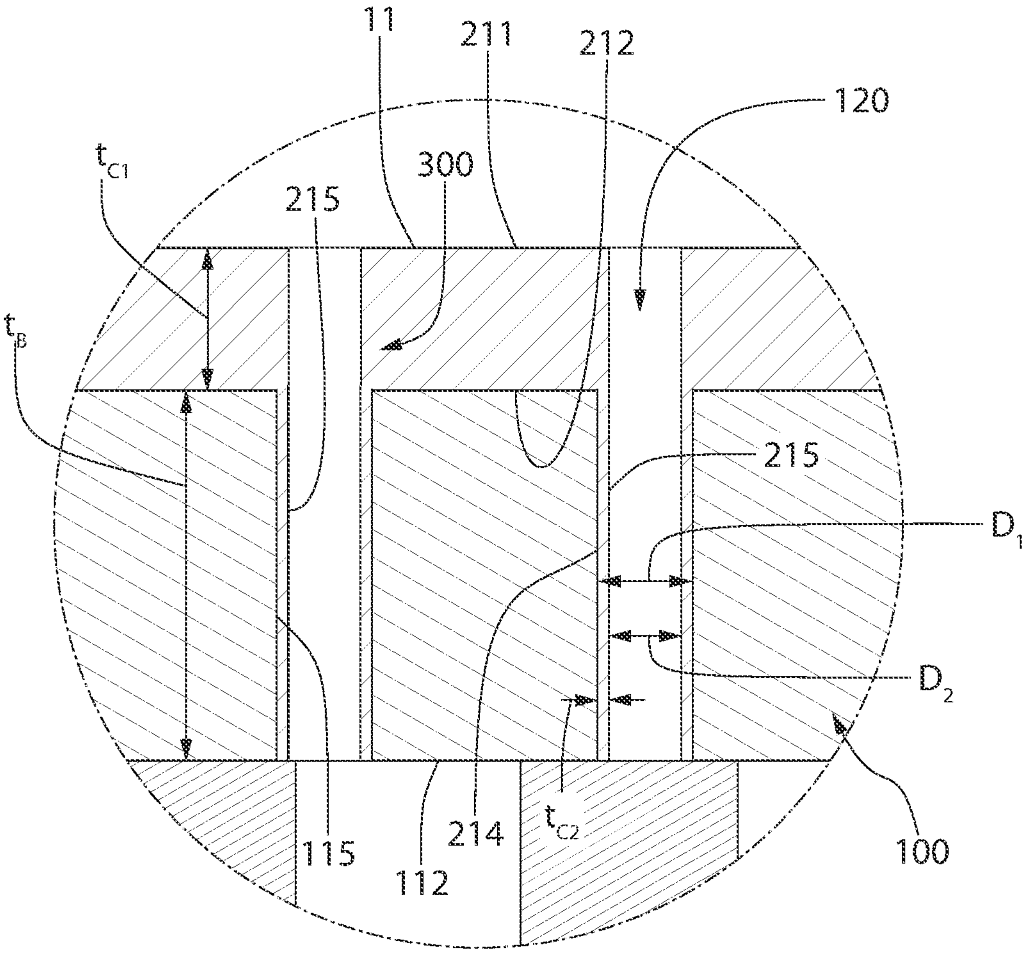
FIG. 3 is close-up view of region X as set forth in FIG. 2.

Referring now to FIGS. 1-3, the building panel 10 of the present invention comprises a body 50 having a coating 200 applied thereto. The body 50 may comprise a first major surface 51 opposite a second major surface 52 and a side surface 53 extending there-between. The coating 200 may be applied to the first major surface 51 of the body 50.

The body 50 may comprise a first layer 100. The first layer 100 may comprise a first major surface 111 opposite a second major surface 112 and a side surface 113 extending there-between. The coating 200 may be applied to the first major surface 111 of the first layer 100.

As discussed in greater detail herein, the building panel 10 may comprise a plurality of coated perforations 20 that extend from first major exposed surface 11 to the second major exposed surface 12 of the building panel 10.

Each of the plurality of coated perforations 20 extend continuously between the first major exposed surface 11 and the second major surface 112 of the first layer 100. Each of the plurality of coated perforations 20 form in-part of an open channel that provide for fluid communication through the building panel 10 between the first major exposed surface 11 and the second major exposed surface 12.

The body 50 may comprise a plurality of body perforations 60 extending from the first major surface 51 to the second major surface 52 of the body 50. The body 50 may comprise the first layer 100. The body 50 may further comprise a second layer 300. The body 50 may further comprise a third layer 400. The building panel 10 may further comprise a backing layer 500.

The second layer 300 may comprise a first major surface 311 opposite a second major surface 312 and a side surface 313 extending there-between. The second layer 300 may comprise a plurality of perforations 320 extending from the first major surface 311 toward the second major surface 311 of the second layer 300.

The third layer 400 may comprise a first major surface 411 opposite a second major surface 412 and a side surface 413 extending there-between. The third layer 400 may comprise a plurality of perforations 420 extending from the first major surface 411 toward the second major surface 411 of the third layer 400.

The backing layer 500 may comprise a first major surface 511 opposite a second major surface 512 and a side surface 513 extending there-between.

The second layer 300 may be formed of a cellulosic material. The third layer 400 may be formed of a cellulosic material. The fourth layer 500 may be formed of a fibrous material. The fibrous material may be a felt layer. The fourth layer 500 may be porous.

The second major exposed surface 12 of the building panel 10 may be formed by the fourth layer 500. The second major exposed surface 12 of the building panel 10 may be formed by the second major surface 512 of the fourth layer 500.

The first layer 100 may be arrange atop the second layer 300. The first layer 100 may be arrange atop the second layer 300 such that the second major surface 112 of the first layer 100 faces the first major surface 312 of the second layer 300. The first layer 100 may be arrange atop the second layer 300 such that the second major surface 112 of the first layer 100 contacts the first major surface 312 of the second layer 300.

The second layer 300 may be arrange atop the third layer 400. The second layer 300 may be arrange atop the third layer 400 such that the second major surface 312 of the second layer 300 faces the first major surface 412 of the third layer 400. The second layer 300 may be arrange atop the third layer 400 such that the second major surface 312 of the second layer 300 contacts the first major surface 412 of the third layer 400.

The combination of the plurality of perforations 120 of the first layer 100, the plurality of perforations 320 of the second layer 300, and the plurality of perforations 420 of the third layer 400 may make up the plurality of perforations 60 of the body 50. The plurality of perforations 120 of the first layer 100 may at least partially overlap the plurality of perforations 320 of the second layer 300. The plurality of perforations 320 of the second layer 300 may at least partially overlap the plurality of perforations 420 of the third layer 400 may make up the plurality of perforations 60 of the body 50. The overlapping configuration creates an open pathway through the body 50 for the plurality of perforations 60 to extend between the first major surface 51 and the second major surface 52 of the body 50.

The perforations 120 of the first layer 100 may also be referred to as the "first layer perforations" 120. The first layer perforations 120 may be circumscribed by a first layer perforation wall 130 extending from the first major surface 111 of the first layer 100 toward the second major surface 112 of the first layer 100. Each of the plurality of first layer perforations 120 extend continuously between the first major surface 111 and the second major surface 112 of the first layer 100.

Each of the plurality of first layer perorations 120 have a first diameter $D_1$ as measured by the distance between the first layer perforation wall 130. The first diameter $D_1$ of each of the plurality of first layer perforations 120 may range from about 0.1 mm to about 40 mm—including all diameters and sub-ranges there-between.

The first layer 100 may be formed from a cellulosic material. The cellulosic material may be one or more of wood, bamboo, and a combination thereof, and may be naturally occurring or engineered. Non-limiting examples of wood include cherry, maple, oak, walnut, pine, poplar, spruce, chestnut, mahogany, rosewood, teak, ash, hickory, beech, birch, cedar, fir, hemlock, basswood, alder wood, obeche wood, and combinations thereof. The cellulosic material imparts authentic decorative features 30 of real wood and/or bamboo (e.g., wood grain, knots, burl, etc.) to the building panel 10.

The first layer 100 may be formed from a single layer of material (also referred to as an integral structure). Although not pictured, the coating 200 of the present invention may be applied to a non-woven scrim. Non-limiting examples of non-woven scrim include fiberglass non-woven scrims. The non-woven scrim may form at least one of the first or second major surface 11, 12 of the building panel 10. The first layer perforation wall 130 may be formed of cellulosic material.

The building panel 10 may comprise a decorative pattern 30 that is visible from the upper major surface 11, the lower major surface 12, and/or the major side surface 13. The decorative pattern 30 may comprise a pattern formed from natural materials, such as cellulosic materials (e.g., wood grain, knots, burl, etc.) or a synthetic material such as a printed ink. The decorative pattern 30 may be a body decorative pattern that exists on one of the first major surface 111, second major surface 112, or side surface 113 of the first layer 100, whereby the body decorative pattern is visible through the coating 200.

The coating 200 may be independently applied to each of the first major surface 111, the second major surface 112 (not shown), and/or the side surface 113 of the first layer 100 (not shown). In a preferred embodiment, the coating 200 is applied to the first major surface 111 of the first layer 100—as shown in FIGS. 1-3.

The coating 200 may be clear or substantially clear. For the purposes of this application, the phrases "substantially clear" or "substantially transparent" refers to materials that have the property of transmitting light in such a way that a normal, human eye (i.e., one belonging to a person with so-called "20/20" vision) or a suitable viewing device can see through the material distinctly. The level of transparency should generally be one which permits a normal, human eye to distinguish objects having length and width on the order of at least 0.5 inches, and should not significantly distort the perceived color of the original object. The coating 200 should be substantially clear (or substantially transparent) such that the underlying body decorative feature can be visible from the upper major surface 11 of the building panel 10 as the decorative pattern 30 on the overall building panel 10, as discussed further herein. The term "substantially clear" or "substantially transparent" may also refer to the coating having at least 70% optical clarity, whereby 100% optical clarity refers to an underlying surface being completely unhindered visually by the coating 500.

Referring now to FIGS. 2-3, the coating 200 may comprises an upper coating surface 211 opposite a lower coating surface 212. The coating 200 may comprise a coating side surface 213 that extends from the upper coating surface 211 to the lower coating surface 212 and forms a perimeter of the coating 200. The coating side surface 213 may form a portion of the major side surface 13 of the building panel 10. Stated otherwise, the major side surface 13 of the building panel 10 may comprise the coating side surface 213.

The coating 200 may have a first coating thickness "$t_{C1}$" ranging from about 0.5 mils to about 3.0 mils—including all values and sub-ranges there-between—as measured from the upper coating surface 211 to the lower coating surface 212. The coating 200 may be applied atop the first major surface 111 of the body 100 in an amount ranging from about 70 g/m$^2$ to about 150 g/m$^2$—including all amounts and sub-ranges there-between. In some embodiments, the coating 200 may be applied atop the first major surface 111 of the body 100 in an amount ranging from about 80 g/m$^2$ to about 140 g/m$^2$—including all amounts and sub-ranges there-between.

The coating 200 may also extend into at least one of the plurality of body perforations 120. The coating 200 may extending into each of the plurality of body perforations 120. The coating 200 may extending along the body perforation wall 130. The coating 200 may extend along the body perforation wall 130 from the first major surface 111 to the second major surface 112 of the body 100. The coating 200 may extend along the entirety of the body perforation wall 130 from the first major surface 111 to the second major surface 112 of the body 100.

The coating 200 located inside of the body perforation 120 may have an outermost surface 215 opposite an innermost surface 214. The innermost surface 214 of the coating 200 may be in contact with the body perforation wall 130 of the body 130. The coating 200 applied to the body perforation wall 130 may have a second coating thickness "$t_{C2}$".

The combination of the coating 200 applied to the body perforation wall 130 of each of the plurality of body perforations 120 may result in the plurality of coated perforations 20 of the building panel 10.

The second coating thickness $t_{C2}$ may be equal to less than about 40% of the first diameter $D_1$ of the body perforation 120. In some embodiments, the second coating thickness $t_{C2}$ may be equal to about 1% to about 40% of the first diameter $D_1$ of the body perforation 120—including all percentages and sub-ranges there-between. Through this thickness to diameter relationship, the coated perforations 20 are able to maintain an open channel that provides for fluid communication through the building panel 10 between the first major exposed surface 11 and the second major exposed surface 12 even though the coating 200 occupies a fraction of the volume created by the body perforations 120.

Each of the plurality of coated perforations 20 have a second diameter $D_2$ as measured by the distance between the outermost surface 215 and the innermost surface 213 of the coating 200 located within each of the body perforations 120. The second diameter $D_2$ may be equal to the first diameter $D_1$ minus 2× of the second coating thickness $t_{C2}$—as shown by the formula below:

$$D_2 = D_1 - 2(t_{C2})$$

The volume of the coated perforation 20 that is occupied within the second diameter $D_2$ may be referred to as an open-channel of the building panel 10—thereby allowing airflow through the building panel 10—as discussed in greater detail herein. The volume of the coated perforation 20 that is occupied within the second diameter $D_2$ may be substantially free of the coating 200. The volume of the coated perforation 20 that is occupied within the second diameter $D_2$ may be free of the coating 200.

The plurality of coated perforations 20 having the aforementioned diameter and thickness relationships result in a building panel 10 that is a capable of allowing for airflow through the building panel 10 between the first major exposed surface 11 and the second major exposed surface 12. The airflow results in the building panel capable of exhibiting acoustical performance—thereby allowing the building panel to function as an acoustical building panel. Specifically, the airflow may allow the building panel to exhibit an noise reducing characteristics quantified by a Noise Reduction Coefficient (NRC) rating, as described in American Society for Testing and Materials (ASTM) test method C423. This rating is the average of sound absorption coefficients at four ⅓ octave bands (250, 500, 1000, and 2000 Hz), where, for example, a system having an NRC of 0.90 has about 90% of the absorbing ability of an ideal absorber. A higher NRC value indicates that the material provides better sound absorption and reduced sound reflection.

The building panel 10 may exhibit an NRC of at least about 0.4 as measured between the first major exposed surface 11 and the second major exposed surface 12. In some embodiments, the building panel 10 have an NRC ranging from about 0.40 to about 0.90—including all value and sub-ranges there-between.

The building panel 10 may exhibit an airflow resistance of less than about 12,000 rayls as measured between the first major exposed surface 11 and the second major exposed surface 12. In some embodiments, the building panel 10 have an airflow resistance ranging from about 4,000 to about 12,000 rayls—including all value and sub-ranges there-between.

The coating 200 may be a flame retardant coating. The coating may be substantially clear. The coating may comprise an inorganic composition. According to the present invention, the phrase "inorganic composition" refers to a dry-state composition having less than 3 wt. % of organic compounds present based on the total dry-weight of the referenced inorganic composition, preferably less than 1.5 wt. % of organic compounds present based on the total dry-weight of the referenced inorganic composition. According to the present invention, the phrase "inorganic composition" may also refer to a wet-state composition that has less than 5.0 wt. % of organic compounds present based on the total wet-weight of the referenced inorganic composition, preferably less than 3.0 wt. % of organic compounds present based on the total wet-weight of the referenced inorganic composition.

The phrase "dry-weight" refers to the weight of a referenced component or composition without the weight of any carrier. Thus, when calculating the amounts of components based on dry-weight, the calculation are to be based solely on the solid components (e.g., binder, filler, hydrophobic component, fibers, etc.) and should exclude any amount of residual carrier (e.g., water, VOC solvent) that may still be present from a wet-state, which will be discussed further herein. Additionally, according to the present invention, the phrase "dry-state" refers to a component or composition that is substantially free of carrier, as compared to the phrase "wet-state," which refers to that component still containing various amounts of carrier. The term "weight-state" refers to a component or composition that further comprises a carrier. Similarly, the phrase "wet-weight" refers to a total weight of component or composition that includes the weight of the carrier when in the wet-state.

The coating composition may be referred to as a flame retardant composition or a glass-forming composition. When exposed to high-heat (e.g., during a fire), the inorganic composition is capable of creating a strong insulative barrier between the body 100 and high heat originating from a fire. The inorganic composition of the present invention exhibits a high pH that ranges from about 9 to about 13—including all pHs and sub-ranges there-between. In a preferred embodiment, the pH ranges from about 10 to less than about 13—including all pHs and sub-ranges there-between. In a preferred embodiment, the pH is about 11.

The inorganic composition may comprise a silicate compound. Non-limiting examples of the silicate compound may include potassium silicate, tetraethyl orthosilicate, and combinations thereof.

The silicate compound may be present in an amount ranging from about 50 wt. % to about 98 wt. %—including all wt. % and sub-ranges there-between—based on the total weight of the inorganic composition in the dry-state. In a preferred embodiment, the silicate compound may be present in an amount ranging from about 70 wt. % to about 90 wt. %—including all wt. % and sub-ranges there-between—based on the total weight of the inorganic composition in the dry-state.

The flame-retardant coating may comprise a surfactant. The surfactant of the present invention may include an amphoteric surfactant. Amphoteric surfactants comprise both an anionic and cationic moiety. Surfactants may be present in an amount ranging from about 0.01 wt. % to about 1.5 wt. % based on the weight of the flame-retardant coating in the dry-state.

According to an embodiment of the present invention, the surfactant may be substantially free of non-ionic surfactant. According to an embodiment of the present invention, the surfactant may be free of non-ionic surfactant. According to an embodiment of the present invention, the flame retardant coating may be substantially free of non-ionic surfactant. According to an embodiment of the present invention, the flame-retardant coating may be free of non-ionic surfactant.

According to an embodiment of the present invention, the flame retardant coating may be substantially free of cationic surfactant. According to an embodiment of the present invention, the flame retardant coating may be free of cationic surfactant.

The surfactant of the present invention may comprise amphoteric surfactant and also be substantially free of cationic surfactant even with the amphoteric surfactant comprising a cationic moiety. Although the amphoteric surfactant comprises a cationic moiety, the additional presence of the anionic moiety results in the overall surfactant being amphoteric, not cationic. As a result, the omission of "cationic" surfactant does not run afoul of the presence of the amphoteric surfactant.

It has been surprisingly discovered that the flame retardant coating comprising the amphoteric surfactant exhibits an improvement in flowability and leveling that results in an unexpected improvement in how the coating 200 sits atop the first layer perforation wall 130 such that it allows for a uniform coating within the coating perforation 20 while also maintaining the second diameter $D_2$ of the open channel, thereby imparting flame-retardancy to the plurality of first layer perforations 120 while also not eliminating the acoustical performance of the overall building panel 10.

The inorganic composition may further comprise alumina trihydrate. The alumina trihydrate may be present in an amount ranging from about 0.5 wt. % to about 12.5 wt. %—including all wt. % and sub-ranges there-between—based on the total weight of the inorganic composition in the dry-state. Additionally, compositions of the present invention may comprise a hydrate compound (e.g., alumina trihydrate), but that alone will not render that composition in a wet-state. Rather, the presence of water must be in a non-hydrate form (i.e., not bound in a crystalline matrix). A non-limiting example of composition being in the wet-state is the inorganic composition of the present invention further comprises aqueous water—i.e., water acts as a solvent whereby the inorganic composition may be the solute.

Figure 5:
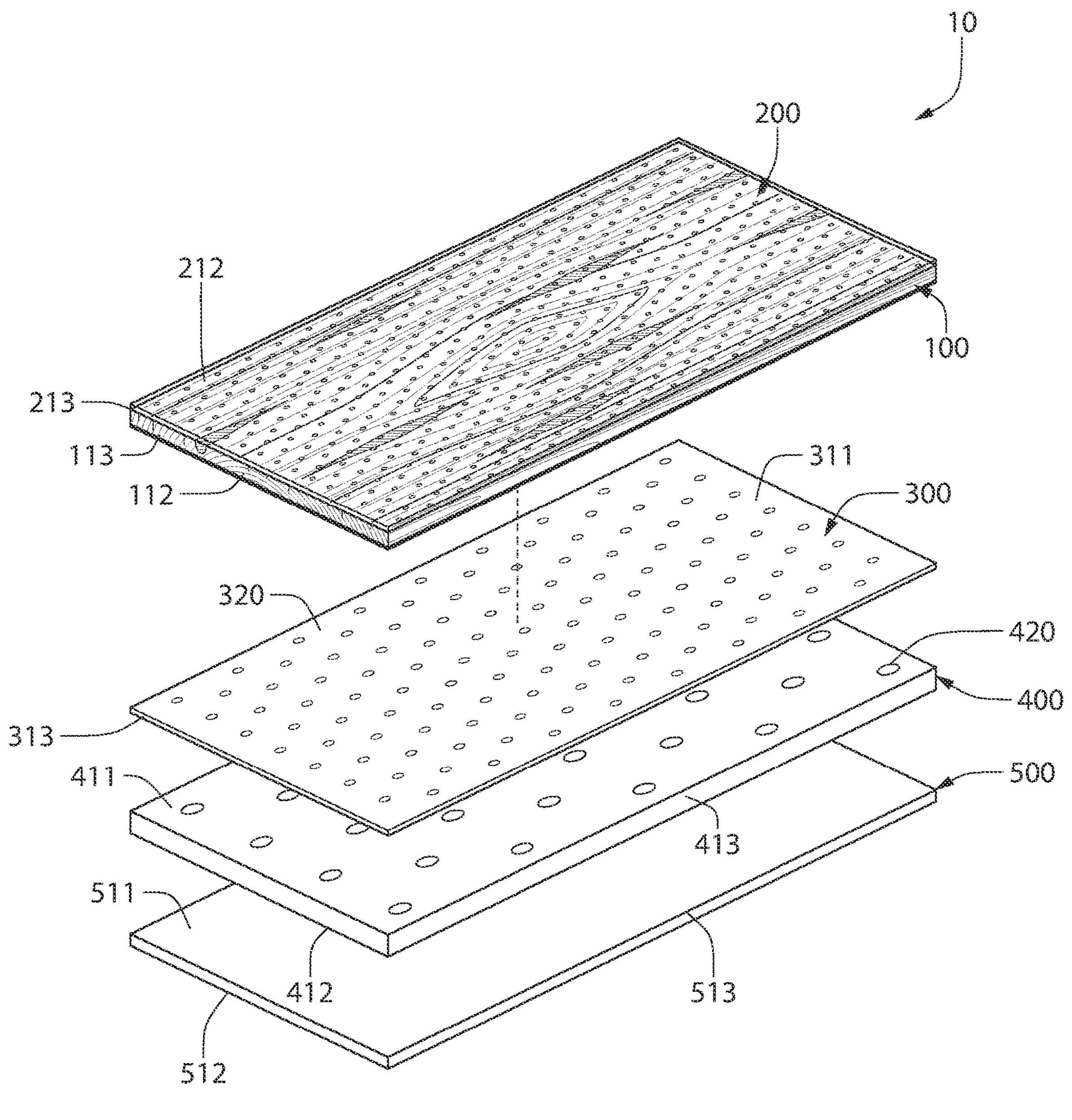
FIG. 5. is an exploded perspective view of the building panel of FIG. 1.

Upon exposure to elevated temperatures, the silicate compounds react to form a silicate glass layer (also referred to as the "glass layer"). The glass layer forms a hard protective and heat-insulative barrier that is especially helpful in preventing the first layer 100 from igniting at elevated temperatures, for example when the first layer 100 is formed from a cellulosic material as discussed further herein. The heat-insulative barrier formed by the coating 200 is especially useful when the upper major surface 11, lower major surface 12, and/or side surface 13 of the building panel 10 is exposed to heat from a fire that exists in the active room environment 2 of the ceiling system 1 (as shown in FIG. 5). The heat-insulative barrier created by the inorganic composition slows and prevents further propagation of heat and flame through the coating 200 and, therefore, through the rest of the body 100 of the building panel 10.

At such elevated temperature, the hydrate present in the alumina trihydrate may be released and create a gaseous expansion within the glass layer. The gaseous expansion may cause the glass layer to lift away from the major surface 111, 112, 113 of the first layer 100, thereby further separating the underlying first layer 100 from the high-heat in the surrounding environment, thereby further protecting the first layer 100 from damage during a fire.

The inorganic composition may optionally comprise other additives or fillers such as, but not limited to fire retarding compounds (also referred to as "flame retardant"), adhesion promoters, char-forming additives, viscosity modifying agents, dispersants, waxes, latex polymer, wetting agents, catalyst, cross-linkers, oxidizers, ultra-violet stabilizers.

The oxidizers may be present in the inorganic coating in an amount ranging from about 0.1 wt. % to about 2 wt. %—based on the total dry weight of the inorganic coating—including all amounts and sub-ranges there-between. Non-limiting examples of oxidizers include peroxide, hydrogen peroxide, and the like, as well as combinations thereof.

In some embodiments, the inorganic coating composition may comprise a chelation forming agent that are capable of reacting with tannins present in cellulosic materials. The reaction between the chelation forming agent and the tannin form a chelation compound comprising a metal ion and ligands formed from the tannin. By capturing the tannin in the chelation compound, the tannin is prevented from creating a yellowing effect in the resulting coating. Non-limiting examples of chelation forming agent is zinc oxide, aluminum zirconium, and combinations thereof. In a preferred embodiment, the chelation forming agent is zinc oxide. The chelation forming agent may be present in the inorganic coating in an amount ranging from about 0.1 wt. % to about 2 wt. %—based on the total dry weight of the inorganic coating—including all amounts and sub-ranges there-between.

According to some embodiments, the inorganic composition may further comprise organic compounds so long as the overall inorganic composition includes less than 5 wt. % of organic compounds in the overall inorganic composition. According to some embodiments, the inorganic composition may be substantially free of blowing-agent. The wetting agent may be present in a non-zero amount that is less than about 0.1 wt. %—based on the total dry-weight of the inorganic composition.

The filler may be present in the inorganic coating in an amount ranging from about 15 wt. % to about 75 wt.

%—including all amounts and sub-range there-between—based on the total dry weight of the inorganic coating. Non-limiting examples of filler may include calcium carbonate ($CaCO_3$), aluminum carbonate ($Al_2(CO_3)_3$), lithium carbonate ($LiCO_3$), magnesium carbonate ($MgCO_3$), fumed silica, aluminum oxide ($Al_2O_3$), and combinations thereof.

The flame retardants may be present in the coating 500 in an amount ranging from about 0 wt. % to about 50 wt. %—including all values and sub-ranges there-between—based on the total weight of the coating 500. Non-limiting examples of flame retardant may include ammonium hydroxide, magnesium hydroxide, huntite, hydromagnesite, silica, polyphosphate, chloride salts—such as sodium chloride, antimony oxide, and borates, such as calcium borate, magnesium borate, zinc borate, and combinations thereof.

Generally, the coating 200 may be formed by applying a coating composition directly to one of the first major surface 111, the second major surface 112, and/or the side surface 113 of the first layer 100, optionally with the addition of a carrier such as water—i.e., in the wet-state. In the wet-state, the liquid carrier may be present in an amount ranging from about 40 wt. % to about 95 wt. %—based on the total weight of the coating composition (solid components+liquid carrier).

The coating composition in the wet-state may be applied by spray, roll-coating, dip coating, curtain coating, brushing, blade coating, or the like, followed by drying and/or curing (optionally with the addition of heat) for a period of time to form the coating atop at least one of the first major surface 111, the second major surface 112, and/or the side surface 113 of the first layer 100—as discussed in greater detail herein. During application of the coating composition, at least a portion of the applied coating composition enters the plurality of first layer perforations 120 and coats the first layer perforation walls 130.

The coating composition may be dried from the wet-state to the dry-state at a temperature ranging from about 150° F. to about 220° F.—including all temperatures and sub-ranges there-between.

Referring to FIG. 4, the building panel 10 of the present invention may be a ceiling panel (as shown installed in the ceiling system of FIG. 4), a wall panel, or the like. The lower major surface 12 of the ceiling panel 10 of the present invention may face the plenum space 3 of an interior space of a ceiling system 1. The upper major surface 11 of the ceiling panel 10 of the present invention may face the active space 2 of an interior space of a ceiling system 1.

In non-exemplified embodiments, the present invention may include a building panel having an upper major surface opposite a lower major surface, the building panel comprising a cellulosic layer (also referred to as "cellulosic body" in this embodiment) and a coating. The cellulosic body is self-supporting and comprises an upper cellulosic surface and a lower cellulosic surface opposite the upper cellulosic surface. Non-limiting examples of a cellulosic body may include MDF board, wooden planks, or the like. The cellulosic body may have a cellulosic body thickness as measured from the lower cellulosic surface to the upper cellulosic surface that ranges up to about 3 inches—including all values and sub-ranges there-between.

With the coating 200 being formed at drying temperatures as low as 140° F., the cellulosic body may at least partially retain pre-existing moisture already contained within the cellulosic body. The surprising benefit of retaining the pre-existing moisture is that during exposure to high-heat, the retained moisture is converted to steam and driven out of the cellulosic body. As the steam escapes from the first layer 100, the glass layer formed from the coating 200 is pushed outward from the first layer 100, thereby increasing the distance between the first layer 100 and the surrounding flame or high-heat—thereby decreasing the likelihood that the first layer 100 ignites. Stated otherwise, it has been surprisingly discovered that the coatings 200 of the present invention further enhance fire repellency in the building panels 10 by allowing for drying temperatures below 212° F. under atmospheric conditions (at 1 atm).

The following examples are prepared in accordance with the present invention. The present invention is not limited to the examples described herein.

EXAMPLES

The following experiments subjected the flame-retardant coating composition of the present invention to both an ASTM E-84 test to measure the flame spread and smoke density performance as well as measured airflow resistance of a perforated panel having the coating applied thereto to determine the impact of the coating on the change in airflow resistance for the perforations.

The experiments were performed by applying a number of flame-retardant coating formulations to a series of identical perforated wooden bodies. Each of the flame-retardant coatings formulated in the wet-state and comprising water, a silicate compound, and aluminum trihydrate—whereby each formulation varied only in the type of surfactant selected, as indicated below in Table 1. Each surfactant was present in a loading amount of 0.3 wt. %. Each coating was observed for stability, determining whether the coating gelled over time, exhibiting an uncontrolled increase in viscosity, or remained stable by not gelling and/or exhibiting a stable viscosity—the results shown below in Table 1.

TABLE 1

| | Surfactant | Type | Coating Stability |
|---|---|---|---|
| Ex. 1 | Propoxylated ethoxylated linear alcohol | Non-Ionic | No Gelling But Unstable Viscosity Increase |
| Ex. 2 | Alkyl imino dipropionic acid monosodium salt | Amphoteric | Gelled |
| Ex. 3 | Cocamidopropyl Betaine | Amphoteric | No Gelling |
| Ex. 4 | Polysorbate 20 | Non-Ionic | Gelled |
| Ex. 5 | Soritane monooleate | Non-Ionic | Gelled |
| Ex. 6 | Branched Secondary Alcohol Ethoxylate | Non-Ionic | Gelled |
| Ex. 7 | Humectant (Sugar Ester) | Non-Ionic | Gelled |
| Ex. 8 | Anionic Surfactant | Anionic | Gelled |

As demonstrated by Table 1, it was surprisingly discovered that the surfactant to avoid gelling—as well as exhibit both stable viscosity—was the amphoteric surfactant, specifically the cocamidopropyl bentaine compound.

Surface Tension Test

With the cocamidopropyl bentaine surfactant providing a coating that is stable in viscosity and did not gel, further formulation work was performed to test the impact of loading amount of surfactant on surface tensions. The results are set forth below in Table 2.

TABLE 2

| | Surfactant | Wet Wt. % | Surface Tension (mN/m) |
|---|---|---|---|
| Ex. 9 | Cocamidopropyl Betaine | 0.0 | 35.3 |
| Ex. 10 | Cocamidopropyl Betaine | 0.2 | 33.5 |
| Ex. 11 | Cocamidopropyl Betaine | 0.3 | 32.0 |
| Ex. 12 | Cocamidopropyl Betaine | 0.4 | 32.0 |
| Ex. 15 | Cocamidopropyl Betaine | 0.5 | 34.1 |

As demonstrated by Table 2, it has been surprisingly discovered that superior surface tension is achieved at a loading amount of about 0.3 wt. % to about 0.4 wt. % in the wet-state. Such results are surprising as a greater loading amount (i.e., 0.5 wt. % of Ex. 15) exhibit relatively inferior surface tensions values—which are unexpected given that the presence of such surfactant would expect to further improve such surface tension values as loading amount increases.

Flame and Smoke Test

A third test was performed to evaluate the coating amount of the Ex. 3 coating formulation on flame spread and smoke index. Three separate coatings amounts were applied to a cellulosic substrate and the coated major surface faced the flame from a Bunsen burner. Each surface was exposure for a set predetermined amount of time, after which the amount of flame spread on each specimen was measured and assigned a value—the lower the Flame Spread Rating ("FSR") value and Smoke Development Index ("SDI"), the better the coating was at imparting flame-retardancy to the underlying substrate. The FSR and SDI performance of each coating is set forth below in Table 3.

TABLE 3

| | Dry Application Amount (g/ft$^2$) | FSR | SDI |
|---|---|---|---|
| Ex. 16 | 9.0 | 30 | 5 |
| Ex. 17 | 10.9 | 20 | 10 |
| Ex. 18 | 12.7 | 20 | 10 |

As demonstrated by Table 3, it has been surprisingly discovered that FSR and SDI performance can be achieved at 10.9 gift$^2$ (i.e., Ex. 17) that is equivalent to that of an application rate of 12.7 g/ft$^2$ (i.e., Ex. 18). Such benefit provides an unexpected advancement as desirable flame and smoke performance can be achieved without necessitating extreme application amounts of coating.

Airflow Test

A fourth test was performed to evaluate the presence of the surfactant in the coating on airflow through the resulting building panel. For this test, a number of coatings that are identical other than the surfactant details were applied to a number of perforated bodies having identical perforation size and perforation density. The dry application amount of each coating and surfactant detail with corresponding airflow resistance is set forth below in Table 4.

TABLE 4

| | Dry Application Amount (g/ft$^2$) Per Layer | Number of Layers | Cocamidopropyl Betaine Surfactant | Bottom Vacuum | Airflow Resistance (rayls) |
|---|---|---|---|---|---|
| Ex. 19 | 5.0 | 2 | 0.0 wt. % | No | N/A (Holes Blocked) |
| Ex. 20 | 10.9 | 1 | 0.0 wt. % | No | N/A (Holes Blocked) |
| Ex. 21 | 10.9 | 1 | 0.0 wt. % | Yes | N/A (Holes Blocked) |
| Ex. 22 | 5.0 | 2 | 0.0 wt. % | Yes | 8,000-12,000 |
| Ex. 23 | 10.9 | 1 | 0.3 wt. % to 0.5 wt. % | Yes | 4,000-6,000 |

As demonstrated by Table 4, the presence of the amphoteric surfactant in the coating composition (i.e., Ex. 23) surprisingly resulted a coating that allowed for an airflow resistance as low as 4,000 to 6,000 rayls, which is indicative of the building panel perforations not being blocked by such coating composition. Further surprising is the presence of the amphoteric surfactant allows for an even greater total coating application amount (i.e., 10.9 gift$^2$ in Ex. 23 as compared to 10 g/ft$^2$ of Ex. 22) while having superior airflow resistance. Further surprising is the presence of the amphoteric surfactant allows for the coating to be applied in a single application (i.e., single application in Ex. 23) as compared to that of two or more separate applications (i.e., two applications of Ex. 22) while still having a superior airflow resistance.

What is claimed is:

1. A building panel comprising a first major exposed surface opposite a second major exposed surface, the building panel comprising:

a body having a first major surface opposite a second major surface and a plurality of body perforations extending from the first major surface toward the second major surface;

a flame-retardant coating atop the first major surface of the body and extending into the plurality of body perforations, the coating comprising a silicate compound and an amphoteric surfactant comprising cocamidopropyl betaine, wherein the amphoteric surfactant is present in an amount ranging from about 0.3 wt. % to about 0.5 wt. % based on the total weight of the flame-retardant coating, and wherein the flame-retardant coating is substantially free of non-ionic surfactant;

wherein the building panel has an airflow resistance ranging from about 4,000 to about 12,000 rayls, the acoustic airflow resistance representing a pressure drop per unit airflow velocity through the building panel via the plurality of body perforations, as measured between the first major exposed surface and the second major exposed surface; and wherein the first major surface of the body is a cellulosic material.

2. The building panel according to claim 1, wherein the amphoteric surfactant is present in an amount ranging from about 0.3 wt. % to about 0.4 wt. % based on the total weight of the flame-retardant coating.

3. The building panel according to claim 1, wherein each of the plurality of body perforations are circumscribed by a body perforation wall extending from the first major surface of the body toward the second major surface of the body, and wherein at least a portion of the body perforation wall is coated by the flame-retardant coating; and wherein the building panel comprises a plurality of coated perforations extending from the first major exposed surface toward the second major exposed surface of the building panel, and wherein each of the coated perforations comprise an open channel that is circumscribed by a coated side wall, the coated side wall formed by the flame-retardant coating applied to the body perforation wall; and wherein the open channel of each of the plurality of coated perforations allow for fluid communication between the first major exposed surface and the second major exposed surface of the building panel; and wherein each of the open channels of the plurality of coated perforations are substantially free of the flame-retardant coating.

4. The building panel according to claim 1, wherein the flame-retardant coating is present atop the first major surface of the body in an amount ranging from about 80 $g/m^2$ to about 140 $g/m^2$.

5. The building panel according to claim 1, wherein the silicate compound is selected from the group consisting of potassium silicate, tetraethyl orthosilicate, and combinations thereof.

6. The building panel according to claim 1, wherein the airflow resistance ranges from about 4,000 to about 6,000 rayls.

7. A building panel comprising:

a body having a first major surface opposite a second major surface and a plurality of body perforations extending from the first major surface toward the second major surface;

a flame-retardant coating in an amount ranging from about 80 $g/m^2$ to about 140 $g/m^2$ atop the first major surface of the body and extending into the plurality of body perforations, the coating comprising a silicate compound and an amphoteric surfactant comprising cocamidopropyl betaine, wherein the amphoteric surfactant is present in an amount ranging from about 0.3 wt. % to about 0.5 wt. % based on the total weight of the flame-retardant coating; and wherein the building panel comprises:

a first major exposed surface opposite a second major exposed surface; and a plurality of coated perforations extending from the first major exposed surface toward the second major exposed surface, wherein the coated perforations are formed by the flame-retardant coating located within of the plurality of the body perforations; and wherein the each of the plurality of coated perforations form an open channel that provide for fluid communication through the building panel between the first major exposed surface and the second major exposed surface.

8. The building panel according to claim 7, wherein the first major surface of the body is a cellulosic material.

9. The building panel according to claim 7, wherein each of the plurality of body perforations are circumscribed by a body perforation wall extending from the first major surface of the body toward the second major surface of the body, and wherein at least a portion of the body perforation wall is coated by the flame-retardant coating.

10. The building panel according to claim 9, wherein each of the plurality of open channels is circumscribed by a coated side wall, the coated side wall formed by the flame-retardant coating applied to the body perforation wall.

11. The building panel according to claim 7, wherein each of the open channels of the plurality of coated perforations are substantially free of the flame-retardant coating.

12. The building panel according to claim 7, wherein the flame-retardant coating further comprises an organic component is selected from the groups consisting of dispersant, wax blend, wax emulsion, and combinations thereof.

13. The building panel according to claim 7, wherein the inorganic coating further comprises filler selected from the group consisting of calcium carbonate, aluminum carbonate, lithium carbonate, magnesium carbonate, silica, fumed silica, and combinations thereof.

14. A building panel comprising:

a body having a first major surface opposite a second major surface and a plurality of body perforations extending from the first major surface toward the second major surface, each of the plurality of body perforations circumscribed by a body perforation wall;

a flame-retardant coating atop the first major surface of the body and extending into the plurality of body perforations and coating at least a portion of the body perforation wall, the coating comprising a silicate compound and an amphoteric surfactant comprising cocamidopropyl betaine, wherein the amphoteric surfactant is present in an amount ranging from about 0.3 wt. % to about 0.5 wt. % based on the total weight of the flame-retardant coating, and wherein the flame-retardant coating is substantially free of non-ionic surfactant; and wherein each of the plurality of body perorations has a first diameter as measured by the distance between the body perforation wall;

wherein the flame-retardant coating located within the body perforation and applied to the body perforation wall has a coating thickness; and wherein the coating thickness is equal to less than about 40% of the first diameter.

15. The building panel according to claim 14, wherein the first major surface of the body is a cellulosic material.

16. The building panel according to claim 14, wherein the amphoteric surfactant is present in an amount ranging from about 0.3 wt. % to about 0.4 wt. % based on the total weight of the flame-retardant coating.

17. The building panel according to claim 14, wherein the silicate compound is selected from the group consisting of potassium silicate, tetraethyl orthosilicate, and combinations thereof.

18. The building panel according to claim 14, wherein the flame-retardant coating is formed from a composition having a pH of at least about 11.

* * * * *